United States Patent [19]

Nitsche et al.

[11] 4,077,502

[45] Mar. 7, 1978

[54] HYDRODYNAMIC-MECHANICAL DRIVE AND BRAKE FOR VEHICLES

[75] Inventors: Martin Nitsche, Gerstetten; Hellmut Weinrich, Konigsbronn; Uwe Mühlberger, Heidenheim, all of Germany

[73] Assignee: Voith Getriebe KG, Heidenheim, Brenz, Germany

[21] Appl. No.: 678,906

[22] Filed: Apr. 21, 1976

[30] Foreign Application Priority Data

Apr. 24, 1975 Germany .............................. 2518186

[51] Int. Cl.$^2$ ............................................. B60K 29/02
[52] U.S. Cl. ..................................... 192/4 B; 74/733; 192/3.23; 192/3.57
[58] Field of Search ................... 192/4 B, 12 A, 3.23, 192/3.22, 3.34; 74/733

[56] References Cited

U.S. PATENT DOCUMENTS

| | | | |
|---|---|---|---|
| 2,787,170 | 4/1957 | Forster | 192/4 B X |
| 3,108,493 | 10/1963 | Hause | 192/4 B X |
| 3,202,018 | 8/1965 | Hilpert | 192/3.33 X |
| 3,621,955 | 11/1971 | Black | 74/733 X |
| 3,749,209 | 7/1973 | Weinrich et al. | 192/12 A X |
| 3,851,739 | 12/1974 | Schneider | 192/3.22 X |

*Primary Examiner*—Benjamin W. Wyche
*Attorney, Agent, or Firm*—Peter K. Kontler

[57] ABSTRACT

A hydrodynamic-mechanical vehicle drive wherein an engine drives the primary portion of an input clutch whose secondary portion can receive torque with varying degrees of slip and rotates the pump of a counter-rotating hydrodynamic torque converter, either directly or through the medium of a differential. The turbine of the converter is adjacent to the inlet side of the pump and drives the input shaft of a reversing gearing which utilizes a friction clutch to drive the take-off shaft forwardly and a friction brake to drive the take-off shaft in reverse. The turbine and the pump rotate in the same direction during hydrodynamic braking and the pump is then rotated at a speed which depends on the degree of slip of primary portion of the input clutch relative to the secondary portion. The clutch or the brake of the reversing gearing operates without slip during hydrodynamic braking, and the converter has a guide blade ring which is disposed between the pump and the turbine, as considered in the direction of fluid flow in the converter chamber from the pump toward the turbine. The ring changes the direction in which the fluid circulates under the action of the pump. The control system of the drive includes a control valve or an analogous component which changes over the reversing gearing in response to a braking command, and means for automatically increasing the slip of the input clutch when the control valve changes over the reversing gearing.

21 Claims, 9 Drawing Figures

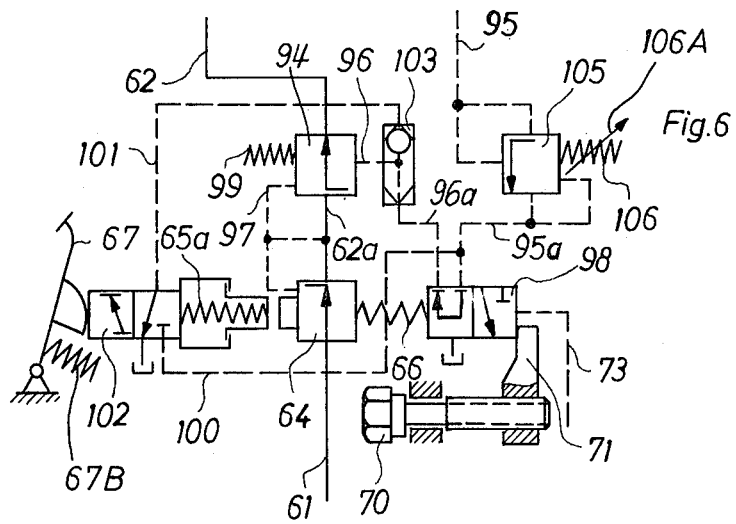
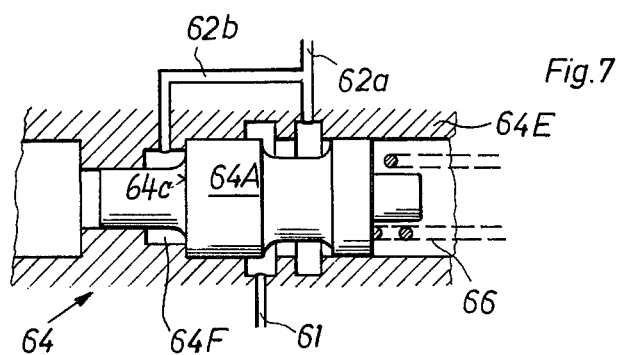
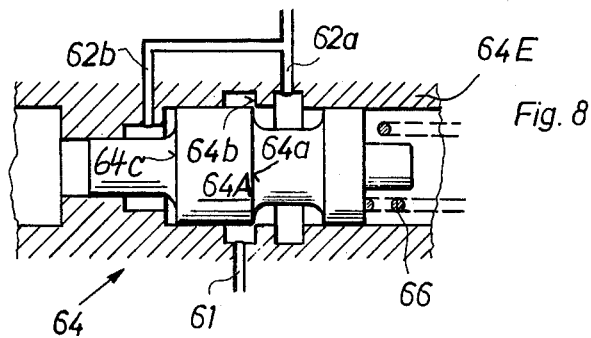

HYDRODYNAMIC-MECHANICAL DRIVE AND BRAKE FOR VEHICLES

BACKGROUND OF THE INVENTION

The present invention relates to improvements in hydrodynamic-mechanical drives for buses, fork lifts or other types of vehicles. More particularly, the invention relates to improvements in torque converters and other parts of hydrodynamic-mechanical drives for vehicles.

U.S. Pat. No. 3,202,018 to Hilpert discloses a power transmission which includes a so-called direct or triloc converter. The converter comprises a customary driving member (pump), a driven member (turbine) which is designed for substantially centripetal flow of fluid therethrough, and a stator (guide blade ring) which is installed in the radially inner region of the converter chamber and is designed for axial flow of fluid therethrough. During traction operation, the pump and turbine of the converter rotate in the same direction. If during travel of the vehicle, the reversing gearing of the transmission is changed over, the turbine rotates counter to its normal direction of rotation. Thereby and by causing the input clutch between the prime mover and the pump of the converter to operate with a certain amount of slip, the converter can perform a hydrodynamic braking operation. A drawback of the just described transmission is that, during hydrodynamic braking, friction between the primary and secondary portions of the input clutch is extremely high. This is due to the fact that, in the converter of Hilpert, the specific pump torque is extremely high in the so-called counterbraking range. Furthermore, the turbine torque is also excessively high during the major part of the counterbraking range so that the corresponding friction clutch of the reversing gearing must operate with a sustantial amount of slip during hydrodynamic braking, i.e., friction between the primary and second parts of the friction clutch is extremely high. Therefore, the reversing gearing of the patented transmission must employ a powerful friction clutch whose parts must be cooled by a complex, expensive and bulky cooling system. The situation is further aggravated due to the fact that, during certain stages of the counterbraking range (i.e., at certain values of the ratio $n_T/n_P$ of turbine and pump speeds), the specific turbine torque fluctuates within a wide range or varies at a totally unpredictable rate.

U.S. Pat. No. 3,749,209 to Weinrich et al. discloses a modified drive which employs a counter-rotating torque converter. The latter is, like that of Hilpert, used selectively for traction or for hydrodynamic braking of the vehicle. It is further known to provide a vehicle drive with a counter-rotating torque converter and an input clutch which transmits torque from a prime mover (e.g., a variable-speed engine) to the pump of the converter. However, in each such conventional drive, hydrodynamic braking invariably takes place only when the converter pump is idle, namely when the pump is arrested by a so-called pump brake. Therefore, hydrodynamic braking torque which is absorbed by the turbine decreases very pronouncedly as the speed of the turbine decreases. Consequently, it is impossible to bring the vehicle at least close to a full stop by hydrodynamic braking alone. In this respect, the braking action of conventional drives resembles that of a flow brake. Also, a desired braking torque can be selected only by changing the extent to which the converter chamber is filled with fluid whenever the turbine of the converter rotates at a high speed.

SUMMARY OF THE INVENTION

An object of the invention is to provide a hydrodynamic-mechanical drive, particularly for vehicles, which is constructed and assembled in such a way that, when the drive is set for hydrodynamic braking operation, frictional and other stresses upon the portons of the input clutch and/or frictionally operated motion transmitting devices of the reversing gearing are subjected to stresses which are a small fraction of stresses upon corresponding parts in conventional drives.

Another object of the invention is to provide a novel and improved hydrodynamic torque converter for use in the above outlined drive.

A further object of the invention is to provide a novel and improved control system for the input clutch, converter and reversing gearing of the improved drive.

An additional object of the invention is to provide a hydrodynamic-mechanical drive whose versatility exceeds that of conventional drives, which can be installed and operated in many types of vehicles, and which can be designed to furnish a hydrodynamic braking action during forward or reverse rotation of the take-off means, i.e., of that part which receives torque from the reversing gearing.

The invention is embodied in a hydrodynamic-mechanical drive for vehicles or the like. The improved drive comprises five main parts, namely an engine or another suitable prime mover, a hydrodynamic torque converter, an input clutch which transmits torque from the prime mover to the driving member or pump of the converter, a reversing gearing which is disposed between the driven member or turbine of the converter and a shaft or other suitable rotary take-off means, and a control system for the input clutch, converter and reversing gearing.

The converter of the improved drive is a counter-rotating converter wherein the turbine is disposed in the region of the inlet side of the pump and is arranged for substantially axial flow of fluid therethrough. The converter further comprises at least one guide blade ring which is mounted between the pump and the turbine, as considered in the direction of fluid flow from the pump toward the turbine, and serves to reverse the rotational flow imparted to fluid by the pump, i.e., the direction of circulation of fluid about the axis of the converter.

The input clutch of the improved drive has a primary portion which receives torque from the prime mover and a secondary portion which can receive torque from the primary portion with varying degrees of slip and transmits torque to the pump of the converter. The reversing gearing comprises first and second motion transmitting devices (preferably a friction clutch and a friction brake). One of said devices is engaged for rotation of the take-off means in the one direction and the other of said devices is engaged for rotation of the take-off means in reverse. The control system comprises a control valve or an analogous component which is operable in response to a braking command to change over the reversing gearing to thereby effect operation of the converter in the counterbraking range, and means (e.g., a pressure relief valve) which increases the degree of slip of primary portion of the input clutch relative to the secondary portion in response to the braking command. During traction operation, the turbine of the converter rotates counter to the direction of rotation of the pump, whereas during hydrodynamic braking operation (in the counterbraking range) the direction of rotation of turbine is the same as that of the pump.

The novel features which are considered as characteristic of the invention are set forth in particular in the appended claims. The improved drive itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 illustrates a portion of a drive which constitutes a modification of the drive shown in FIG. 5;

FIG. 7 is an enlarged sectional view of a pressure relief valve in the control system of the drive of FIGS. 1-4, with the valving element of the relief valve shown in one end position;

FIG. 8 shows the structure of FIG. 7 but with the valving element in another end position.

DESCRIPTION OF THE PREFERRED EMBODIMENTS

Figure 1:
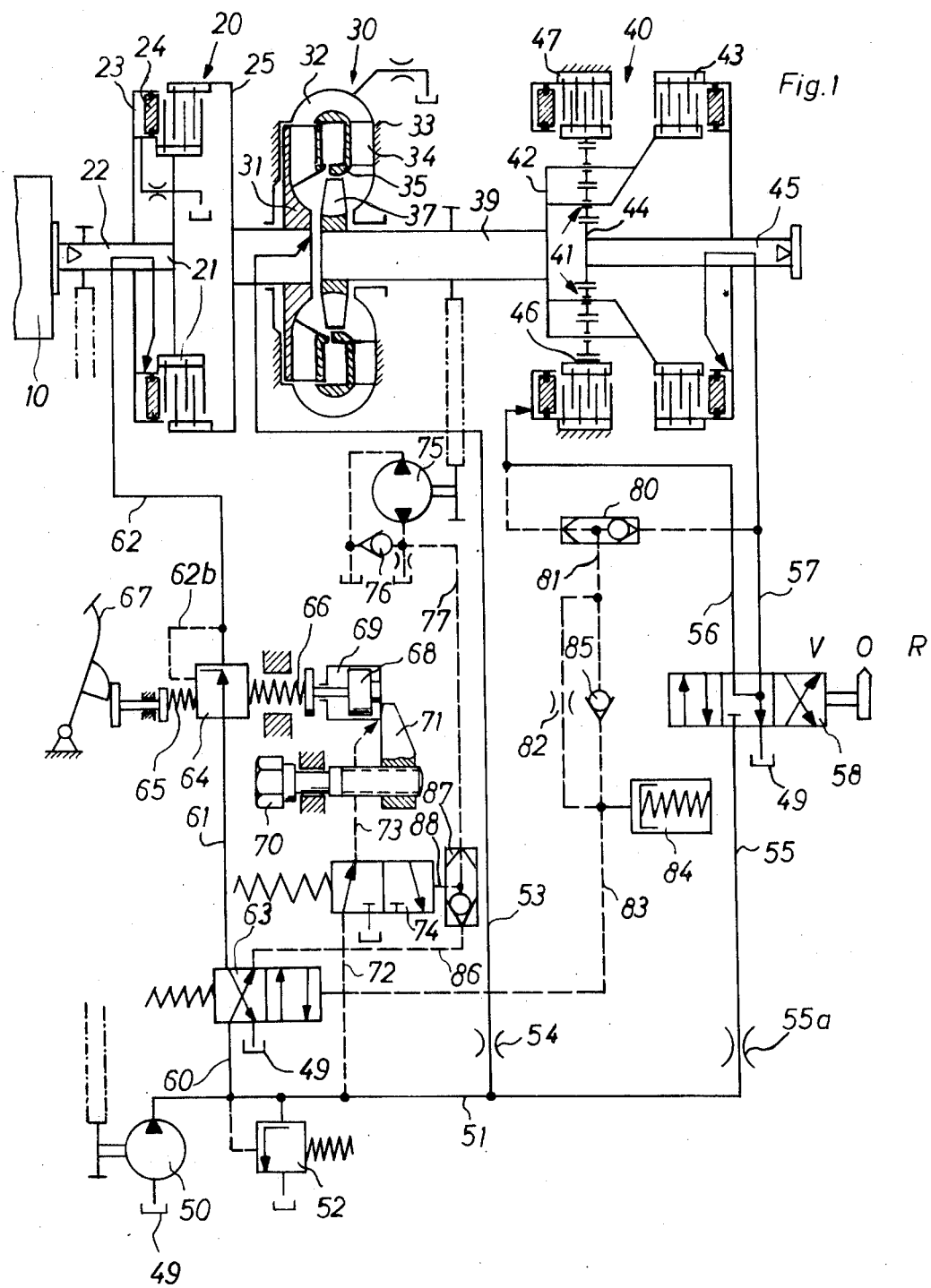
FIG. 1 is a diagrammatic view of a hydrodynamic-mechanical drive which embodies one form of the invention, the parts of the control system being shown in positions they assume when the input clutch, converter and take-off means of the drive are at a standstill.

FIG. 1 shows a vehicle drive which comprises a friction plate type fluid-operated input clutch 20, a hydrodynamic torque converter 30 of the counter-rotating type, and a reversing gearing 40. The primary portion 21 of the input clutch 20 comprises a drive shaft 22 which can be coupled to and then receives torque from a prime mover 10, and a single-acting hydraulic cylinder and piston unit 23 having a ring-shaped piston 24. When the left-hand end face of the piston 24 is subjected to the action of pressurized hydraulic fluid, the piston engages or activates the input clutch 20. The secondary portion 25 of the input clutch 20 is rigidly connected to the driving member or pump 31 of the converter 30. The toroidal working chamber 32 of the converter 30 is defined primarily by a stationary casing or housing 33. The converter 30 further comprises a guide blade ring or stator 34 which reverses the direction of circulation (induced by pump 31) of hydraulic fluid in the chamber 32 (about the axis of the converter), a core ring 35, and a driven member or turbine 37. The latter is rigid with the input shaft 39 of the reversing gearing 40 and rotates counter to the direction of rotation of the pump 31 during traction operation of the vehicle drive. The flow of fluid through the guide blade ring 34 is centripetal. A second guide blade ring (not shown) for axial flow of fluid therethrough may be provided in the radially outer region of the chamber 32. It is advisable and important to place the guide blade ring or rings between the pump 31 and the turbine 37, as considered in the direction of fluid flow in the converter 30. The turbine 37 is located close to the inlet side of the pump 31. It is advantageous to install the turbine 37 in the radially inner region of the chamber 32 in such a way that the flow of fluid through the turbine takes place in the axial or substantially axial direction.

FIG. 1 further shows certain details of a presently preferred construction of the reversing gearing 40. This gearing comprises a planetary transmission having a set of double planet pinions 41, a planet pinion carrier 42 which is rigid with the input shaft 39 and with the primary portion of a first motion transmitting device here shown as a friction plate clutch 43. The sun gear 44 of the planetary transmission is rigidly connected with a take-off shaft 45, which transmits torque to one or more wheels of the vehicle, and with the secondary portion of the clutch 43. The internal, toothed ring gear 46 of the planetary transmission can be arrested by a second motion transmitting device 47 which constitutes a friction plate brake.

The control system of the vehicle drive shown in FIG. 1 is a hydraulic system. However, it is equally within the purview of the invention to employ an electrohydraulic control system. The illustrated control system comprises a source of pressurized hydraulic fluid here shown as a pump 50 which is driven by the shaft 22 and draws oil or another suitable hydraulic fluid from a sump 49, a conduit 51 which supplies pressurized fluid and wherein the pressure of fluid is maintained at a preselected value by a pressure relief valve 52, a conduit 53 which supplies fluid to the converter 30 and contains a flow restrictor 54, and a conduit 55 which admits fluid to the reversing gearing 40 through a conduit 56 or a conduit 57 by way of a command-receiving component 58 constituting a three-position control valve. The conduit 55 contains a flow restrictor 55a. The valving element of the valve 58 controls the reversing gearing 40 and can be moved between a neutral position (O) for idling (shown in FIG. 1), a left-hand position (V) for rotation of the take-off shaft 45 in a forward direction, and a right-hand position (R) for rotation of the shaft 45 in reverse.

The control system further comprises conduits 60, 61 and 62 with a two-position pilot control valve 63 between the conduits 60, 61. The conduit 61 can admit pressurized fluid to the conduit 62 by way of a pressure relief valve 64 which controls the degree of slip of the input clutch 20, and the conduit 62 admits fluid to the input clutch 20 so that the clutch is applied when the cylinder of the unit 23 receives highly pressurized fluid via relief valve 64. The valve 64 regulates the pressure of hydraulic fluid in the conduit 62 so that such pressure equals or is less than that in the conduit 61, depending on the momentary bias of two springs 65 and 66. The bias of the spring 65 is adjustable by a clutch pedal 67 which must be pivoted in a clockwise direction, as viewed in FIG. 1, in order to increase the bias of the spring 65. The valving element 64A (see FIG. 7 or 8) of the relief valve 64 then moves in a direction to the right to thereby reduce the pressure of fluid in the conduit 62. This, in turn, results in slippage or in disengagement of the input clutch 20. The bias of the spring 66 can be changed by the piston 68 of an auxiliary cylinder 69. In FIG. 1, the spring 66 maintains the piston 68 in the right-hand end position, i.e., the bias of the spring 66 is low which means that the valving element 64A maintains hydraulic fluid in the conduit 62 within a relatively low pressure range, the so-called brake pressure range. When the piston 68 is caused to move to the left, as viewed in FIGS. 1 and 2, the bias of the spring 66 increases so that the valving element 64A allows more fluid to flow from the conduit 61 into the conduit 62. This is a relatively high pressure range (the so-called traction pressure range) of hydraulic fluid in the conduit 62. The entire auxiliary cylinder 69 can be shifted by an abutment 71 whose position can be changed by rotating a screw 70, i.e., the initial bias of the spring 66 (in fully retracted position of the piston 68) can be changed by moving the abutment 71 through the medium of the screw 70. The piston 68 can be moved relative to the cylinder 69 in response to admission of pressurized fluid into the right-hand chamber of the cylinder 69 by way of a pipeline which branches off the conduit 51 downstream of the valve 52 and includes two pipes 72, 73 with a regulating valve 74 therebetween.

The input shaft 39 of the reversing gearing 40 is the turbine shaft of the converter 30. This shift drives a bidirectional measuring pump 75 which monitors the direction of rotation of the turbine 37. The two ports of the pump 75 are connected to each other by a check valve 76 in such a way that the pump 75 supplies pressurized fluid to a control pipe 77 only while it is driven by the shaft 39 in one direction. The arrangement is such that the pipe 77 receives pressurized fluid only when the shaft 39 rotates in the rearward direction; the shaft 39 rotates in such direction during hydrodynamic braking.

The conduits 56, 57 are connected with a pipe 81 by way of a double check valve 80 without cross bleed. The pipe 81 receives pressurized fluid when the plate clutch 43 or the brake 47 of the reversing gearing 40 receives pressurized fluid. The pipe 81 communicates with a further pipe 83 by way of a flow restrictor 82. A spring-operated accumulator 84 is connected with the pipe 83 in such a way that, when the pressure of hydraulic fluid in the pipe 81 increases, the accumulator 84 causes a delayed rise of fluid pressure in the pipe 83. The flow restrictor 82 is connected in parallel with a check valve 85 to insure rapid evacuation of fluid from the accumulator 84 in response to each changeover of the valving element in the control valve 58. Each evacuation of fluid from the accumulator 84 via check valve 85 results in at least temporary reduction of fluid pressure in the pipe 83. If the valving element of control valve 58 is held in neutral position (O), the accumulator 84 discharges fluid into the sump 49 and the pressure of fluid in the pipe 83 drops to zero. If the valving element of the control valve 58 is moved directly from forward (V) to reverse (R), or vice versa, the accumulator 84 discharges fluid into the hydraulic cylinder of the clutch 43 or brake 47 of the reversing gearing 40 and thereupon receives a fresh supply of fluid so that the pressure of fluid in the pipe 83 decreases for a short period of time, i.e., during refilling of the accumulator.

When the pressure in the pipe 83 drops (during each change in the position of valving element in the control valve 58), the valving element of the pilot control valve 63 assumes the position which is shown in FIG. 1. Thus, the pressure in the conduits 61, 62 is reduced and the input clutch 20 is disengaged. At the same time, pressurized fluid flows into a control pipe 86 which is connected to one port of the pilot control valve 63. The control pipes 77 and 86 are connected with a double check valve 87 whose outlet port 88 is connected with the regulating valve 74 so that it can supply pressurized fluid to the right-hand end face of the valving element in the body of the valve 74. Thus, the valving element of the regulating valve 74 assumes its left-hand end position when the control pipe 77 and/or 86 supplies pressurized fluid.

Figure 2:
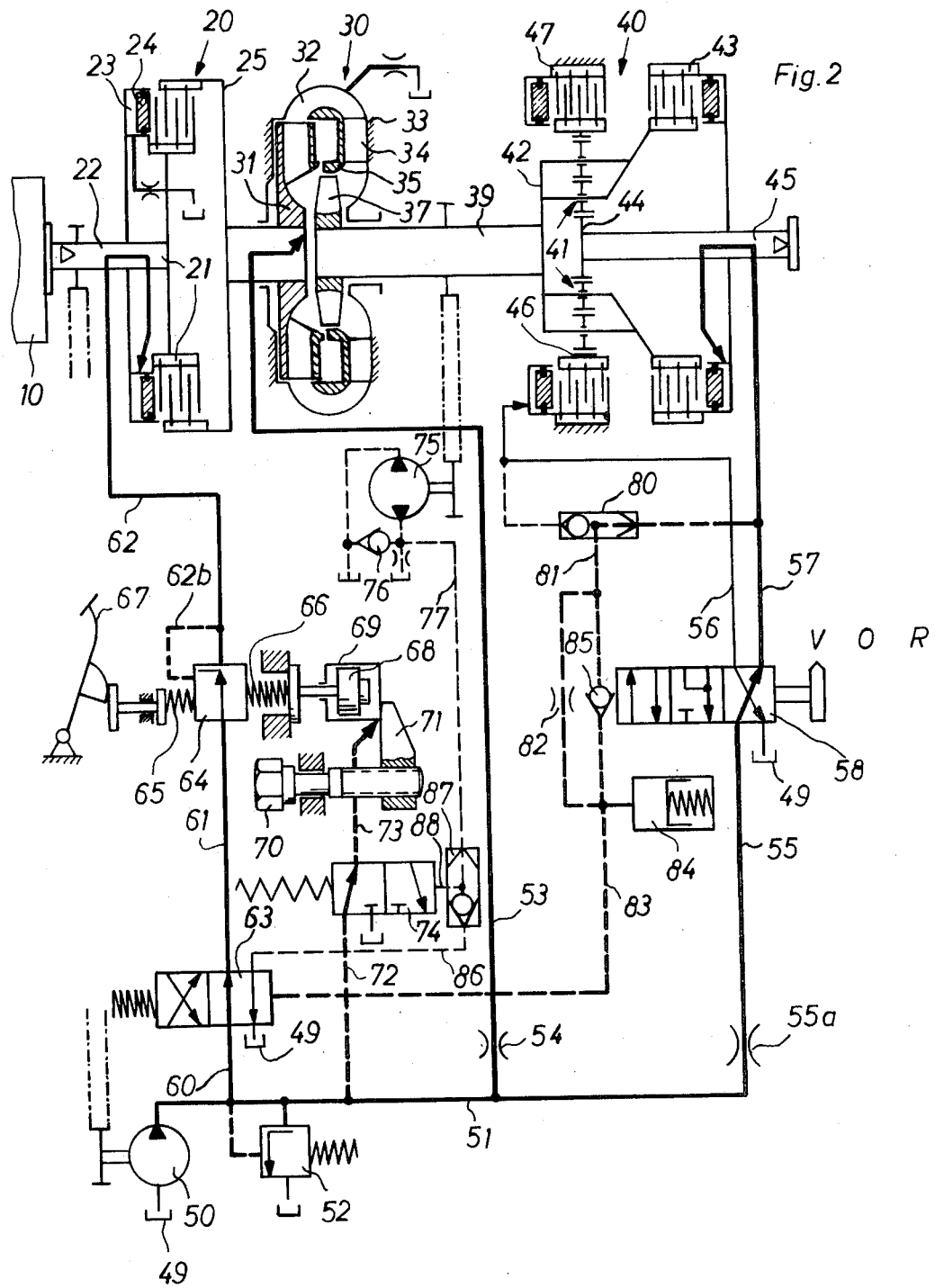
FIG. 2 illustrates the elements of the drive in positions they assume during traction operation.
Figure 3:
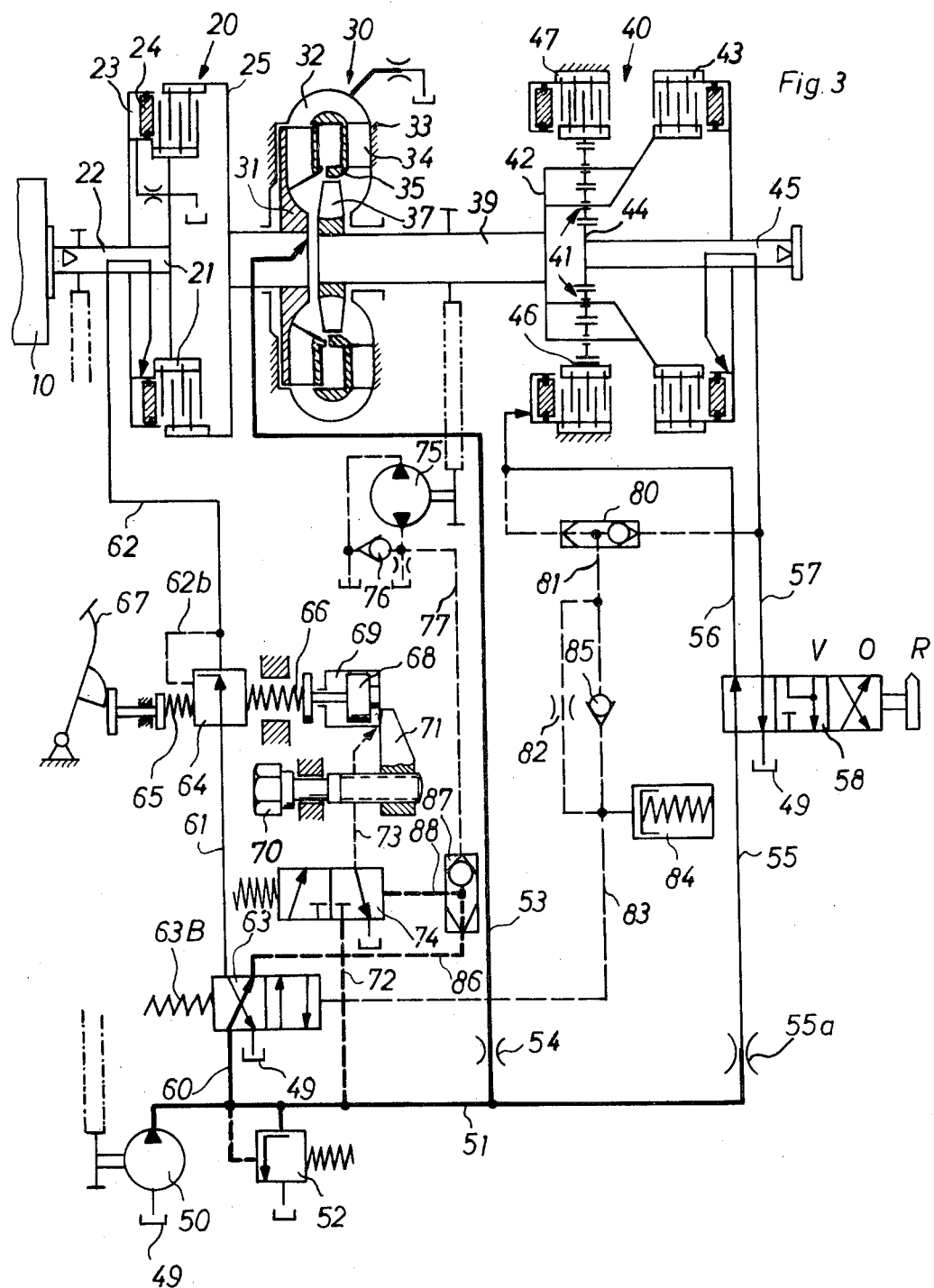
FIG. 3 shows the elements of the drive in positions they assume during changeover from traction operation to hydrodynamic braking.
Figure 4:
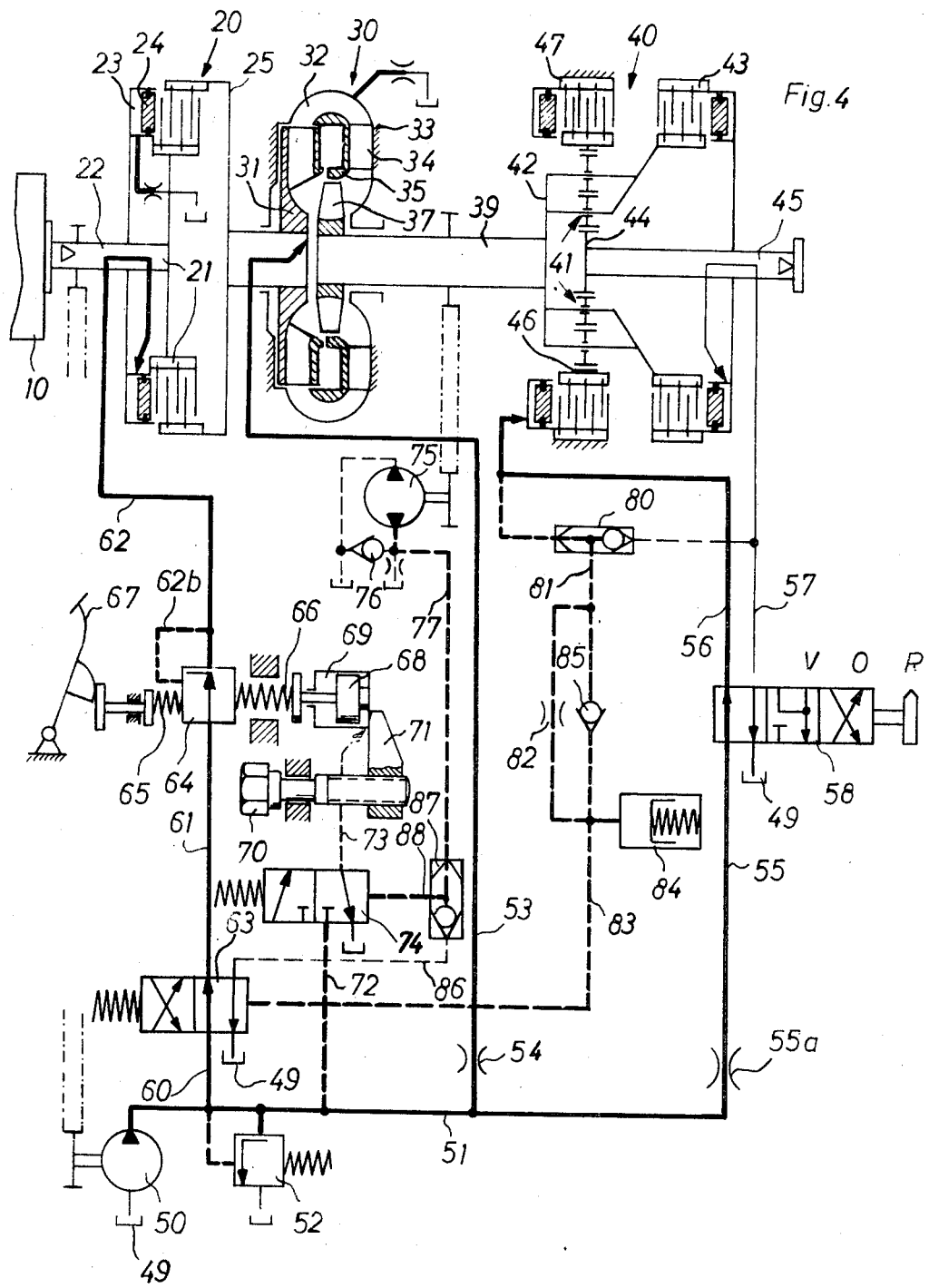
FIG. 4 illustrates the elements of the drive in positions they assume during hydrodynamic braking.

FIG. 1 shows the control system of the improved drive in a state of rest. The fluid in the pipes and conduits is not pressurized, the piston 68 in the auxiliary cylinder 69, the ram of the accumulator 84 and the valving elements of valves 63, 64, 74 assume the positions which are imposed thereupon by the respective springs. In FIGS. 2, 3 and 4, all such conduits and pipes which contain pressurized fluid are indicated by heavier lines (the conduits by solid lines and the pipes by broken lines).

Referring to FIG. 2, the parts of the improved drive are shown in positions they assume during traction operation in the forward direction (i.e., the valving element of the control valve 58 is held in the left-hand end position (V). The conduits 51, 53, 55, 60 and the pipe 72 are first to receive pressurized fluid. Owing to changeover of valving element in control valve 58 from the position (O) which is shown in FIG. 1 to the position (V) of FIG. 2, the conduit 57 receives pressurized fluid from the conduit 55 and the friction plate clutch 43 of the reversing gearing 40 is engaged. The pipes 81, 83 receive pressurized fluid from the conduit 57 so that the valving element of the pilot control valve 63 assumes the left-hand end position shown in FIG. 2. The conduits 60, 61 communicate with each other and the pipe 86 communicates with the sump 49 via pilot control valve 63. Since the input shaft 39 of the reversing gearing 40 rotates in the direction which is required for traction operation, the pressure in the control pipe 77 is zero so that the regulating valve 74 connects the pipe 73 with the pipe 72 and the piston 68 in the auxiliary cylinder 69 stresses the spring 66 to an extent exceeding that shown in FIG. 1. The pressure relief valve 64 operates in the traction pressure range, i.e., and assuming that the clutch pedal 67 is not depressed, the pressure in the conduit 62 is high enough to insure that the input clutch 20 is engaged without any slip. However, the clutch 20 can operate with a desired degree of slip in response to pivoting of the pedal 67 in a clockwise direction, as viewed in FIG. 2.

FIG. 3 shows the parts of the control system during changeover from traction operation (FIG. 2) in the forward direction toward hydrodynamic braking operation during forward travel of the vehicle which embodies the drive. When a braking command is transmitted, the valving element in the body of the control valve 58 moves from the position (V) to the position (R). This results in disengagement of the clutch 43 in the reversing gearing 40 and in engagement or application of the brake 47. While the cylinder of the brake 47 is filled with pressurized hydraulic fluid which flows through conduits 51, 55 and 56 as well as from the accumulator 84 via pipe 81, the pressure of fluid in the pipes 81, 83 (and also in the conduit 55) drops considerably so that the valving element of the pilot control valve 63 returns to the position of FIG. 1 under the action of spring 63B. Consequently, the pressure of fluid in the conduit 61 decreases and the input clutch 20 is disengaged. At the same time, the pilot control valve 63 admits pressurized fluid into the pipe 86 and outlet 88 so that the valving element of the regulating valve 74 moves to the left-hand end position to connect the pipe 73 with the sump 49, i.e., the pressure relief valve 64 operates in the relatively low braking pressure range.

The immediately following hydrodynamic braking operation is shown in FIG. 4. The brake 47 of the reversing gearing 40 is fully or nearly fully engaged and the pressure of fluid in conduits 55, 56 and pipe 81 rises again. Furthermore, the accumulator 84 is filled with pressurized fluid to cause a delayed buildup of fluid pressure in the pipe 83. Consequently, the valving element of the pilot control valve 63 reassumes its left-hand end position so that the input clutch 20 can receive pressurized fluid. The valve 63 connects the control pipe 86 with the sump 49. In the meantime, the shaft 39 rotates in a direction counter to that which is necessary for traction operation so that the pump 75 supplies pressurized fluid to the pipe 77 and outlet 88 to maintain the valving element of the regulating valve 74 in the left-hand end position. Thus, the control pipe 73 remains relieved and the relief valve 64 continues to operate in the lower or braking pressure range whereby the input clutch 20 transmits torque with a certain degree of slip. The degree of slip can be adjusted to any one of several values by appropriate adjustment of the position of abutment 71 and auxiliary cylinder 69 through the medium of the screw 70. If the slip of input clutch 20 is reduced (at a constant speed of the prime mover 10), the speed of the pump 31 in the converter 30 increases thereby raising the hydrodynamic braking torque which is absorbed by the turbine 37. The slip of input clutch 20 can be increased by rotating the screw 70 or by depressing the pedal 67 to thereby reduce the braking torque. Shortly before the vehicle comes to a standstill, the pressure in pipe 77 and outlet 88 drops to zero so that the valving element of the regulating valve 74 reassumes its position of rest and the relief valve 64 operates again in the traction pressure range. The torque which is produced by the converter 30 is maintained at a maximum value when the vehicle comes to a standstill so that the vehicle can begin to move in reverse practically without any delay.

An important advantage of the improved drive over heretofore known hydrodynamic vehicle drives is that the pump 31 is not at a standstill in the course of a hydrodynamic braking operation. Instead, the pump 31 rotates at a variable speed. It has been found that, in a counter-rotating converter, specific pump torque which develops in the course of a hydrodynamic braking operation (i.e., when the pump 31 and the turbine 37 rotate in the same direction) should have a very low value in the practical range of the $n_T/n_P$ ratio (wherein $n_T$ is the speed of the turbine and $n_P$ is the speed of the pump of the counter-rotating converter). Quite surprisingly, the results of experiments with counter-rotating converters indicate that, during hydrodynamic braking, the specific pump torque first decreases while the ratio $n_T/P$ increases from zero, that the specific pump torque thereupon remains substantially constant and hovers close to the zero value in the most important range of the $n_T/n_P$ ratio, and that the specific pump torque thereupon increases very gradually. A feature of our invention resides in the recognition that such characteristic of the counter-rotating converter can be utilized with advantage in the course of hydrodynamic braking by permitting the pump of the converter to rotate at a speed which is dependent on the slip of primary portion 21 of the input clutch 20 with respect to the secondary portion 25. The relatively low value of the specific pump torque insures that stresses upon the input clutch 20 during hydrodynamic braking are only a small fraction of stresses upon the parts of input clutches in conventional drives. The input clutch can be operated with a selected degree of slip for any desired (even very prolonged) periods of time. Thus, by the simple expedient of changing the slip of the input clutch 20, one can change the RPM of the pump 31 and hence the turbine torque which is tantamount to changing the hydrodynamic braking torque.

Another important and advantageous feature of the improved drive is that, in the practically useful range of the $n_T/n_P$ ratio for hydrodynamic braking, the specific turbine torque does not undergo any appreciable changes which, in turn, results in a stable and predictable braking operation. Moreover, it has been found that, during braking operation, the magnitude of is very favorable in torque in relation to the turbine torque during traction operation.

In view of the above-outlined advantageous behavior of the improved drive during hydrodynamic braking, the drive need not be provided with any means for changing the degree to which the converter chamber is filled with fluid. Also, the friction-operated motion transmitting devices 43 and 47 of the reversing gearing 40 can be operated without slip during hydrodynamic braking, i.e., the same as during traction operation.

The feature that the changeover of valve element in the body of control valve 58 results in movement of valving element 64A from a first position in which the pressure of fluid in the conduit 62 is within the traction pressure range (high enough to allow for rotation of primary portion 21 practically without slip relative to the secondary portion 25 of the input clutch 20) to a second position in which the pressure of fluid in conduit 62 is within the braking pressure range so that the input clutch can operate with varying degrees of slip whenever the valve 58 receives a braking command facilitates the operation of vehicle which embodies the improved drive.

Figure 5:
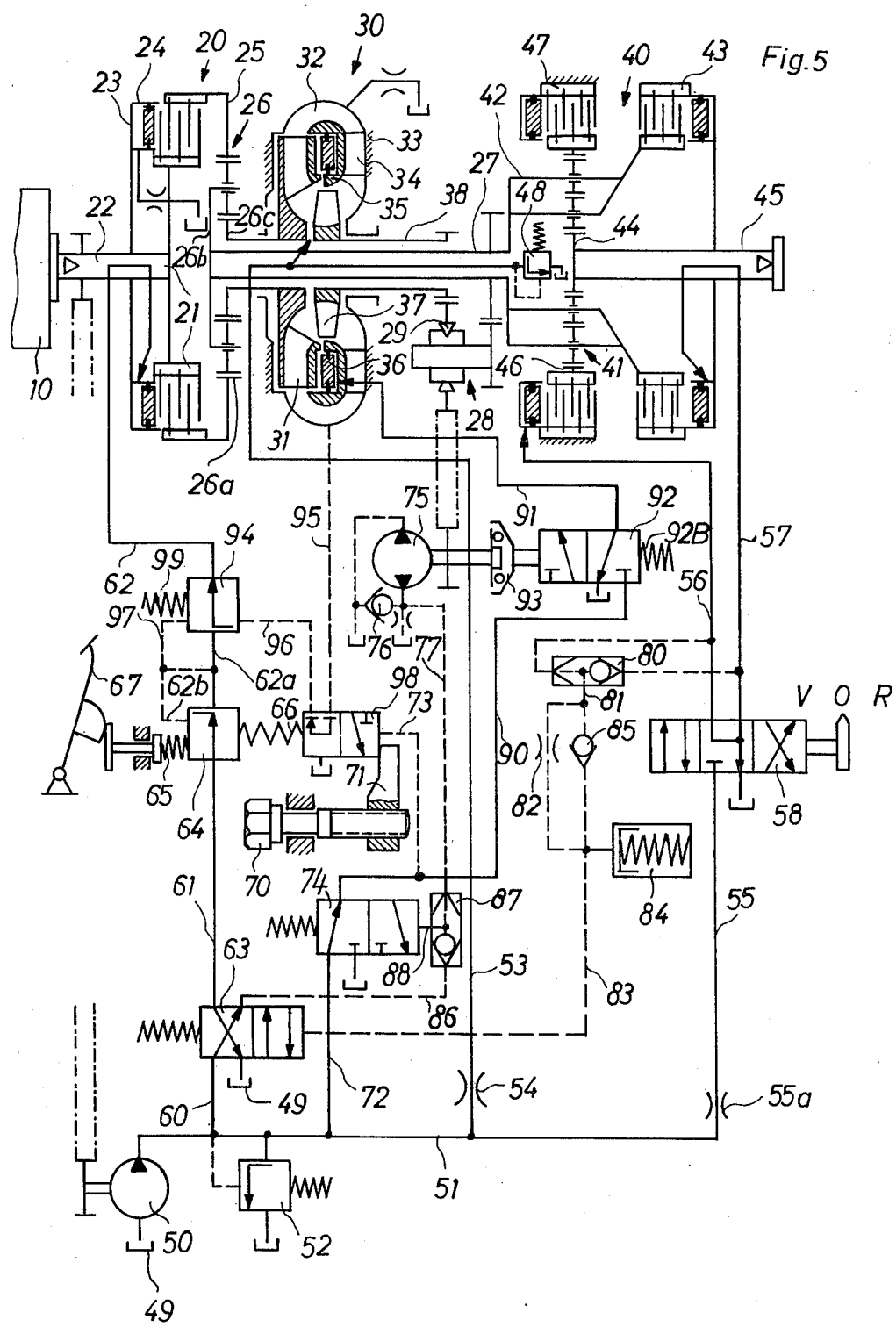
FIG. 5 is a diagrammatic view of a second drive.

FIG. 5 shows a modified drive wherein all such parts which are identical with or clearly analogous to the corresponding parts of the drive of FIGS. 1 to 4 are denoted by similar reference characters.

The drive of FIG. 5 comprises a differential 26 (preferably a planetary) which is installed between the input clutch 20 and the pump 31 of the converter 30. The purpose of the differential 26 is to distribute input power to two branches. The differential 26 has a ring gear 26a which is driven by the secondary portion 25 of the input clutch 20 and a sun gear 26c which is rigid with the pump 31 of the converter 30. The planet pinion carrier 26b of the differential 26 is connected to a hollow shaft 27 which extends through the converter 30 and constitutes the input shaft of the reversing gearing 40. The hollow shaft 38 of the turbine 37 surrounds the shaft 27 and is connected therewith through the medium of a gear transmission 28 and a freewheeling clutch 29. It will be seen that the aforementioned branches include a hydrodynamic branch (converter 30) and a purely mechanical branch (comprising the shaft 27). The two branches merge at the input side of the reversing gearing 40 and both branches are used for transmission of power in the lower speed range of the take-off shaft 45. In the higher speed range of the take-off shaft 45, the transmission of power takes place exclusively through the mechanical branch because the pump 31 of the converter 30 is fixed by a "pump brake" (ring piston 36 in the core ring 35). The pump brake 35, 36 is actuated by fluid which is admitted via conduits 90, 91 and an additional control valve 92 between the conduits 90, 91. The valving element of the control valve 92 can be moved to the left by a spring 92B and to the right by a centrifugal shifting device 93. When the pump brake 35, 36 is on, the pressure of fluid acting on the ring piston 36 in the core ring 35 must exceed the pressure in the working chamber 32 of the converter 30. To this end, the pressure of hydraulic fluid in the conduit 53 for admission of fluid into the converter chamber 32 is reduced to a predetermined value by a pressure limiting valve 48. The just described distribution of power to two branches can be resorted to with equal advantage in the drive of FIG. 1 to 4.

Another difference between the drive of FIGS. 1–4 and the drive of FIG. 5 is that the second drive comprises means for maintaining the hydrodynamic braking torque at a constant or nearly constant value. Such means includes a pressure regulating valve 94 which is installed between the outlet port 62a of the valve 64 and the conduit 62. One end face of the valving element in the body of the valve 94 is subjected to the pressure (hereinafter called converter pressure) of fluid supplied by a control pipe 96 which is connected with the chamber 32 of the converter 30 by a further control pipe 95 and a control valve 98. Since the pressure in the chamber 32 at the inlet side of the pump 31 is constant due to the provision of valve 48, the pressure of fluid in the pipeline 95, 96 accurately reflects the pressure difference which is produced by the converter pump 31 as well as the extent of hydrodynamic braking torque which is absorbed by the turbine 37.

The left-hand end face of valving element in the body of the valve 94 is subjected to the pressure of fluid in the outlet port 62a of the valve 64. The pressure of such fluid is indicative of the desired braking torque. As in the embodiment of FIGS. 1 to 4, the pressure of fluid at the outlet port 62a of the valve 64 is determined by the bias of springs 65, 66, by the position of clutch pedal 67 and by the position of the abutment 71.

The valve 98 of FIG. 5 replaces the auxiliary cylinder 69 and piston 68 of FIGS. 1 to 4. This valve deactivates the valve 94 during traction operation of the drive. The valving element in the body of valve 98 changes the bias of the spring 66 and performs the additional function of controlling the connection between the pipes 95 and 96. The pressure of fluid in the pipe 96 corresponds to pressure in the converter chamber 32 when the pipe 73 is relieved, i.e., during changeover to and during braking operation (refer to FIGS. 3 and 4). Thus, when the fluid in the pipe 96 is under pressure, such (measured) pressure is continuously compared (by the valving element of the valve 94) with the rated pressure in a pipe 97. The spring 99 of the valve 94 merely serves as a compensating means.

A state of equilibrium exists when the bias of the spring 99 plus the fluid pressure in the pipe 97 matches the fluid pressure in the pipe 96. If the braking torque deviates from the desired value (e.g., in response to a change in rotational speed of the prime mover 10), the pressure of fluid in the pipe 96 changes and entails a change of fluid pressure in the conduit 62 to cause a change in the degree of slip of the input clutch 20. This restores the braking torque to the desired (rated) value. Such rated value can be varied within a reasonably wide range by the simple expedient of adjusting the position of abutment 71 through the medium of the screw 70. But, in the course of the braking operation, the rated value can also be changed by changing the position of the pedal 67. When the pump brake 35, 36 is applied during changeover to hydrodynamic braking operation, it must be released at once. To this end, the conduit 90 communicates with the pipe 73 to insure that they are relieved as soon as a changeover to hydrodynamic braking operation takes place.

When the improved drive is installed in a fork lift or an analogous vehicle wherein certain parts must be manipulated with a high degree of accuracy (e.g., with a tolerance of less than one centimeter) at a relatively low speed, it is desirable to insure that the input clutch 20 can be operated with slip in the course of traction operation. Such mode of movement is generally known as inching. German Pat. No. 2,132,144 discloses means which insures that the torque furnished by the vehicle drive during inching can be maintained at a constant value. Such means includes a control device.

FIG. 6 shows a simple but effective control system which insures that the pressure regulating valve 94 can be used to control the braking torque in the course of a hydrodynamic braking operation as well as to control the torque which is produced during inching. To this end, the control system of FIG. 6 comprises a branch pipeline 100, 101 which bypasses the valve 98 and contains an additional control valve 102. The pipe 100 branches off a pipe 95a which is connected with the control pipe 95 from converter chamber 32 by a pressure-reducing valve 105. The pipe 101 is connected with a double check valve 103 which is further connected to a pipe 96a communicating with one port of the valve 98. The valving element in the body of the valve 102 can be displaced by the clutch pedal 67. When the pedal 67 is held in the illustrated position (by a return spring 67B), the valving element in the body of the valve 102 seals the pipe 100 from the pipe 101. When the pedal 67 is depressed, converter pressure is applied to the right-hand end face of valving element in the body of the valve 94 via pipes 95a, 100, 101 and 96. The latter connects the double check valve 103 with the right-hand port of the body of the valve 94. The spring 65a then moves the valving element of the valve 64 to an extent which is determined by the angular position of the pedal 67. Thus, by changing the position of the pedal 67, the operator can select the desired normal or rated value for the delivered torque (due to the fact that changes in angular position of the pedal 67 vary the pressure of fluid in the outlet port 62a and control pipe 97).

The depression of clutch pedal 67 results in a reduction of braking torque. The drivers of some vehicles (e.g., the aforementioned fork lifts) are accustomed to influence the braking torque by changing the position of the accelerator pedal, i.e., to increase the braking torque by depressing the accelerator pedal. This can be achieved in the drive of FIG. 6 by the simple expedient of operatively connecting the abutment 71 with the accelerator pedal so that the latter can change the position of the abutment 71 and hence the position of valving element in the body of the valve 98. Alternatively, the braking torque can be influenced by means of the aforementioned valve 105 between the pipes 95 and 95a. The valve 105 is a pressure-reducing valve; it reduces the pressure in converter chamber 32 by a value which is determined by the bias of an adjustable spring 106. The bias of the spring 106 is adjustable by the accelerator pedal which is indicated symbolically by an arrow 106A. When the bias of the spring 106 increases in response to an appropriate change in the position of the pedal 106A, the pressure in the pipes 95a, 96a, 96 decreases whereby the pressure of fluid in the conduit 62 rises. Thus, the speed of the converter pump 31 increases, together with the braking torque.

In certain types of vehicles, especially road vehicles, it is often sufficient to construct the control system for the input clutch 20, converter 30 and reversing gearing 40 in such a way that the driver can initiate a changeover to hydrodynamic braking operation by actuating the brake pedal whereby such actuation at the same time determines the degree of slip of primary portion of the input clutch with respect to the secondary portion, i.e., the magnitude of the braking torque. This can be achieved only if the speed of the prime mover (such a a variable-speed engine) assumes a fixed value, e.g., if the engine speed than equals the idling speed. This is due to the fact that the speed of the converter pump (and hence the magnitude of hydrodynamic braking torque) depends on the RPm of the primer mover whenever the pump of the converter receives torque by way of an input clutch which operates with varying degrees of slip, unless the drive is provided with expensive and complex auxiliary equipment (see the double-acting hydraulic cylinder 353 in FIG. 3 of the aforementioned patent to Hilpert) which is designed to eliminate the effect of the speed of prime mover upon the braking operation.

However, if a vehicle must change the direction of its movement at frequent intervals (such vehicle may constitute a fork lift, a levelling tractor, a wheel loader or an analogous conveyance), it is desirable to initiate the changeover to hydrodynamic braking operation by changing the position of the lever which is used to change the direction of movement of the vehicle. This will be readily understood since such mode of initiating the braking operation insures that the vehicle can start moving in the opposite direction as soon as the speed of its movement in the first direction is reduced to zero. If the operator of the vehicle were to select the braking torque by actuating a first part (e.g., a brake pedal) and the direction of movement of the vehicle by actuating a second part (e.g., a lever), the operator would be unable to devote sufficient attention to the manipulation of a scoop, fork or a like device on the respective vehicle. Moreover, it takes only a few seconds to bring the vehicle to a standstill subsequent to transmission of a braking command. It is often impossible, during such short interval of time, to adjust the braking torque to the desired value by effecting a more or less pronounced depression of a brake pedal, especially since the prime mover of the vehicle must drive the scoop, fork or another device on the vehicle so that it is impractical to change the speed of the prime mover to a given value (e.g., idling speed) prior to transmission of a braking command. As mentioned above, the patent to Hilpert discloses a double-acting hydraulic cylinder which can eliminate the effect of the speed of the prime mover upon the braking torque. The hydraulic cylinder is installed in the input clutch of the patented power transmission. This cylinder is expensive and bulky; furthermore, it cannot eliminate the effect of other variable parameters (such as the friction coefficient of plates in the input clutch and/or the viscosity of fluid which is used to lubricate and/or cool the input clutch) which also affect the braking torque.

All such drawbacks of the power transmission of Hilpert are avoided in the drive which embodies the control system of FIG. 5 or 6. This control system comprises the regulating valve 94 which insures that the hydrodynamic braking torque remains substantially constant by regulating the slip of primary portion 21 relative to the secondary portion 25 of the input clutch 20. The change in the degree of slip is effected in dependency on the ratio of pressure difference produced by the pump 31 to the variable rated pressure which equals or corresponds to fluid pressure at the outlet 62a of the valve 64.

The control system of FIGS. 5 and 6 differs from the control system which is disclosed in commonly owned German Pat. No. 2,132,144 in spite of the fact that the German patent discloses a regulating valve. The regulating valve of the German patent is used to control the torque which is delivered by the vehicle drive during inching (i.e., during traction operation with a certain degree of slip of primary portion of the input clutch). At such times, the converter of the German patent operates in the normal range at which the speed of the turbine or driven member is relatively low. Such mode of operation is not suggestive of the surprising discovery that, in the counterbraking range, the pressure difference produced by the pump 31 of the converter 30 is a sufficiently accurate indicator of the turbine torque because, during such operation, the turbine 37 rotates in a direction counter to its normal direction of rotation and at a speed which may be anywhere within the overall speed range. Thus, at least at certain times, the RPM of the turbine 37 may reach a very high value. At any rate, the flow conditions prevailing in the converter during inching are entirely different from those when the converter operates in the counterbraking range. The regulating valve 94 constitutes an extremely simple and efficient means for maintaining the braking torque at a substantially constant value. This is due to the fact that the control system need not embody a complicated and sensitive torque measuring device, i.e., it is only necessary to detect the pressure difference (see the conduit 95 in FIG. 5) which is produced by the pump 31 of the converter 30. Thus, and at least in majority of cases, it is sufficient to simply monitor the pressure of fluid at the outlet side of the pump 31. The value of fluid pressure at the inlet side of the pump 31 is maintained constant by the valve 48 of FIG. 5. Consequently, it is not necessary to monitor the differences between the pressures at the two sides of the pump 31. Since a counter-rotating converter invariably comprises a stationary shell or housing, the connection of pipe 95 to such housing in order to determine the pressure difference which is caused by the pump 31 presents no problems.

While the regulating valve 94 of FIGS. 5 and 6 can be used with particular advantage in counter-rotating converters, it can also find useful application in drives which employ direct converters, especially in a drive whose direct converter has a stationary housing or shell.

FIGS. 7 and 8 illustrate a presently preferred construction of the pressure relief valve 64. This valve comprises a body 64E and the aformentioned valving element 64A which is a spool movable back and forth in an axial bore of the body 64E.

FIG. 7 shows the spool 64A in neutral position, i.e., in the left-hand end position in which the spool is held by the spring 66. Therefore, the lands of the spool 64A allow for unrestricted communication between the conduit 61 and outlet port 62a (conduit 62). If the pipe 61 supplies pressurized fluid, such fluid flows to the port 62a and conduit 62 as well as into a control pipe 62b which is in communication with a chamber 64F at the left-hand end face 64c of the spool 64A. The fluid which flows into the chamber 64F moves the spool 64A in a direction to the right against the opposition of the spring 66 (see FIG. 8). The control edge or shoulder 64a of the spool 64A then cooperates with the control edge or internal shoulder 64b of the valve body 64E to throttle the flow of fluid from the conduit 61 into the port 62a. The spool 64A assumes a position of rest when the bias of the spring 66 balances the fluid pressure in the chamber 64F.

The valve 94 of FIGS. 5 and 6 is preferably similar to or identical with the valve 64. The only difference is that one end face of the spool in the body of the valve 94 is biased by the spring 99 as well as by fluid pressure in the pipe 96. The other end face of the spool in the body of the valve 94 is subjected to the pressure of fluid which is supplied by the port 62a and pipe 97, i.e., to the inlet pressure in contrast to the spool 64A whose shoulder 64a is subjected to fluid pressure at the outlet port 62a.

Figure 9:
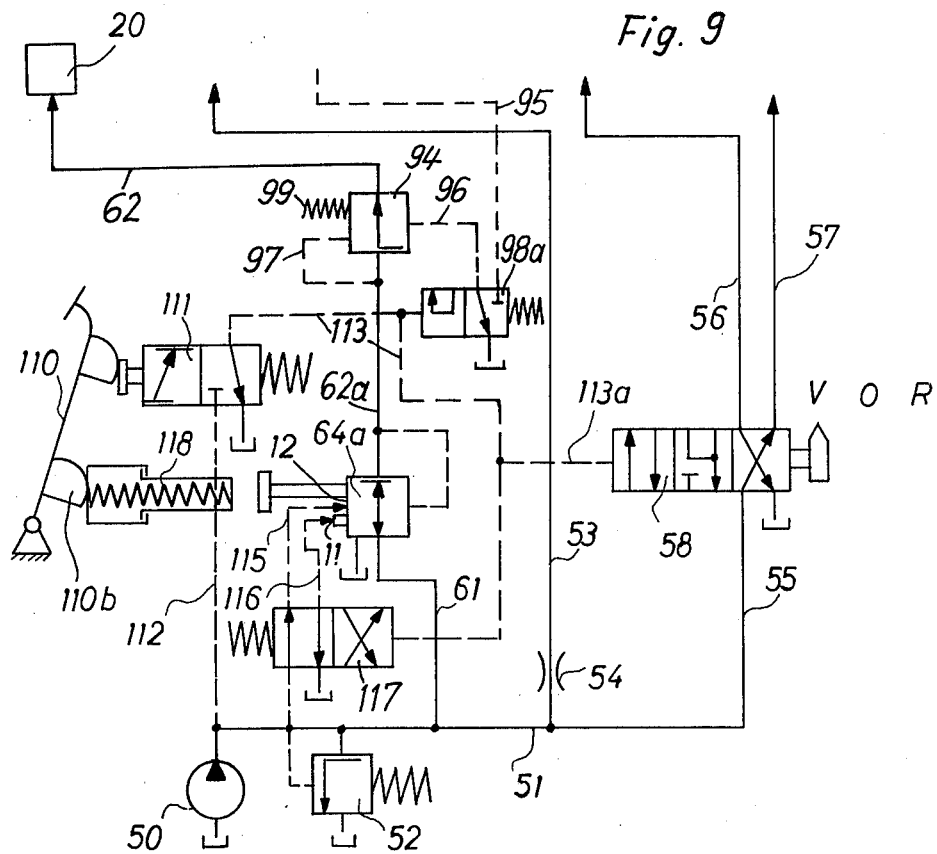
FIG. 9 shows a portion of a modified control system which can be used in the drive of FIGS. 1-4 or FIG. 5.

Referring to FIG. 9, there is shown a portion of a control system which can be used as a substitute for the control system of the drive shown in FIGS. 1-4 or FIG. 5. All such component parts of the control system of FIG. 9 which are identical with or clearly analogous to the corresponding parts of the control systems shown in FIGS. 1-4 and 5 and denoted by similar reference characters.

The clutch pedal 67 is replaced by a brake pedal 110 which can displace the valving element of a valve 111 which thereby establishes communication between a control pipe 112 and a further control pipe 113. When the pipe 113 receives pressurized fluid, the drive receives a command for braking.

The control system of FIG. 9 further comprises a pressure regulating valve 64a which is installed between the conduit 61 and valve 94, i.e., in the conduit means which can convey pressurized fluid to the input clutch 20 (schematically shown in FIG. 9 by a box at the discharge end of the conduit 62). The valve 64a comprises a valving element (e.g., a spool) having a relatively large left-hand end face 12 and a relatively small left-hand end face 11. The chamber which is adjacent to the large end face 12 of the valving element in the body of the valve 64a can receive pressurized fluid from a control pipe 115. The small end face 11 of the valving element in the body of the valve 64a can be subjected to the pressure of fluid which is supplied by a control pipe 116. The pipe 116 receives pressurized fluid from the conduit 51 when the latter is sealed from the pipe 115 by a pilot control valve 117, and vice versa. When the valving element of the valve 117 assumes the position of FIG. 9, the conduit 51 supplies pressurized fluid to the control pipe 115. The valve 64a then operates in the traction pressure range so that the input clutch 20 is fully engaged and its primary portion transmits torque without slip. When a braking command is issued in response to depression of the brake pedal 110, a changeover of the reversing gearing 40 (connected with conduits 56, 57) is initiated because the pipe 113 and a control pipe 113a receive pressurized fluid via valve 111. In addition, depression of the brake pedal 110 results in leftward movement of valving element in the body of the pilot control valve 117 because the right-hand chamber of such body receives pressurized fluid from the pipe 113. The valve 117 causes the valving element of the valve 64a to assume a position corresponding to the braking pressure range so that the primary portion of the input clutch 20 transmits torque with a certain degree of slip. Such condition prevails as long as the brake pedal 110 remains depressed. The pressure of fluid in the outlet port 62a and conduit 62 (and hence the degree of slip of the clutch 20 and the magnitude of hydrodynamic braking torque) can be adjusted by a compression spring 118 which is stressed by a projection or lobe 110b of the brake pedal 110, i.e., the bias of the spring 118 varies as a function of changes in angular position of the pedal 110.

The principle underlying the operation of control system which is shown in FIG. 9 is especially satisfactory in road vehicles, such as buses. It will be noted that the control system of FIG. 9 also comprises a control device (valve 94 performing the functions described in connection with FIG. 5) to which the converter pressure can be applied via pipes 95, 96 and valve 98a. However, this can take place only after the operator of the vehicle has issued a braking command by depressing the pedal 110, i.e., when the pipe 113 contains pressurized fluid. In the course of traction operation, the valve 98a maintains its valving element in the position of FIG. 9 so that the control device (valve 94) is ineffective, i.e., the valving element of the valve 94 does not obstruct the flow of pressurized fluid from the outlet port 62a into the conduit 62 and thence to the input clutch 20.

For the sake of simplicity, the hydrodynamic braking operation of the control system of FIG. 9 has been described only in connection with movement of the vehicle (e.g., a bus) in the forward direction. It will be readily understood that the control system of FIG. 9 can be designed so that it can furnish a hydrodynamic braking action during movement of the vehicle in forward or reverse.

Without further analysis, the foregoing will so fully reveal the gist of the present invention that others can, by applying current knowledge, readily adapt it for various applications that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In a hydrodynamic-mechanical drive, particularly for vehicles, a combination comprising a prime mover; a counter-rotating hydrodynamic torque converter including a driving member having an inlet side and arranged to effect circulation of fluid in a predetermined direction, a driven member disposed in the region of said inlet side and arranged for substantially axial flow of fluid therethrough, and at least one guide blade ring disposed between said members, as considered in the direction of fluid flow between said members, to reverse the direction of fluid circluation which is effected by said driving member; an input clutch having a primary portion receiving torque from said prime mover and a secondary portion arranged to receive torque from said primary portion with varying degrees of slip and to transmit torque to said driving member; rotary take-off means; a reversing gearing disposed between said driven member and said take-off means and including first and second motion transmitting devices respectively engageable to rotate said take-off means in first and second directions; and a control system including a component operable in response to a braking command to change over said reversing gearing to thereby effect operation of said converter in the counterbraking range, and means for increasing the degree of slip of said primary portion with respect to said secondary portion in resonse to said braking command.

2. A combination as defined in claim 1, wherein said input clutch is a fluid-operated clutch and said control system further comprises a source of pressurized fluid and conduit means connecting said source with said input clutch, said means for increasing the degree of slip comprising a pressure relief valve installed in said conduit means and having valving means movable between first and second positions to thereby respectively permit the flow of fluid to said input clutch within a traction pressure range which is high enough to effect operation of said input clutch at least substantially without slip and a braking pressure range at which said input clutch operates with varying degrees of slip, said control system further comprising means for effecting movement of said valving means to said second position in response to transmission of a braking command to said component.

3. A combination as defined in claim 2, wherein said motion transmitting devices of said reversing gearing are operated by pressurized fluid and said control system further comprises second conduit means connecting said source with said devices, said means for effecting movement of said valving means to said second position being responsive to a drop of fluid pressure in said second conduit means as a result of changeover from engagement of one of said devices to engagement of the other of said devices.

4. A combination as defined in claim 3, wherein said control system further comprises means for monitoring the direction of rotation of said driven member and for maintaining said valving means in said second position as long as said driving and driven members rotate in the same direction.

5. A combination as defined in claim 2, wherein said control system further comprises regulating means for maintaining the hydrodynamic braking torque substantially constant, said regulating means being arranged to adjust the slip of said input clutch in dependency on the ratio of pressure difference produced by the driving member of said converter to a variable rated pressure.

6. A combination as defined in claim 5, wherein said valve has an outlet for admission of fluid to said input clutch and the pressure of fluid at said outlet equals or varies proportionally with said rated pressure.

7. A combination as defined in claim 5, wherein said control system further comprises means for deactivating said regulating means during traction operation of said drive.

8. A combination as defined in claim 5, wherein said regulating means comprises a second valve installed in said conduit means between said first mentioned valve and said input clutch to vary the pressure of fluid in said conduit means, said second valve having a mobile valving element whose position, and hence the pressure of fluid in said input clutch, is determined by two opposing forces which are respectively representative of said pressure difference and said rated pressure.

9. A combination as defined in claim 8, wherein said control system further comprises means for deactivating said second valve during traction operation of said drive, including means for disconnecting said second valve from said converter.

10. A combination as defined in claim 9, wherein said control system further comprises means for coupling said valves so as to disconnect said second valve from said converter substantially simultaneously with movement of said valving means to said first position and to connect said second valve with said converter substantially simultaneously with movement of said valving means to said second position.

11. A combination as defined in claim 9, wherein said control system further comprises a pipeline which connects said converter with said second valve, a branch pipeline which bypasses said deactivating means, a control valve in said branch pipeline which, for the purpose of rendering said second valve effective during traction operation, is arranged to open said branch pipeline in response to a command for inching, and means for transmitting the command for inching to said first mentioned valve.

12. A combination as defined in claim 11, wherein said command transmitting means includes a clutch pedal.

13. A combination as defined in claim 5, wherein said control system further comprises a pipeline connecting said converter with said regulating means and a pressure-reducing valve in said pipeline.

14. A combination as defined in claim 1, further comprising a differential disposed between said secondary portion of said input clutch and said driving member and arranged to distribute input power to two branches which merge downstream of said converter, one of said branches including said converter and the other of said branches including means for effecting mechanical transmission of power.

15. A combination as defined in claim 14, wherein said converter further comprises a brake for fixing said driving member in the upper speed range of said take-off means.

16. A combination as defined in claim 15, wherein said control system further comprises means for disengaging said brake in response to said braking command.

17. A combination as defined in claim 16, wherein said disengaging means is responsive to a drop in pressure of said fluid.

18. A combination as defined in claim 16, wherein said control system further comprises means for monitoring the direction of rotation of said driven member and for disengaging said brake as long as said driving and driven members rotate in the same direction.

19. A combination as defined in claim 18, wherein said input clutch is a fluid-operated clutch and said control system further comprises a source of pressurized fluid and conduit means connecting said source with said input clutch, said means for increasing the degree of slip comprising a pressure relief valve installed in said conduit means and having valving means movable between first and second positions to thereby respectively permit the flow of fluid to said input clutch within a traction pressure range which is high enough to effect operation of said input clutch at least substantially without slip and a braking pressure range at which said input clutch operates with varying degrees of slip, said control system further comprising means for effecting movement of said valving means to said second position in response to transmission of a braking command to said component, said component and said monitoring means cooperating to maintain said valving means in said first position within said traction pressure range and said component and said monitoring means respectively effecting the movement of said valving means to said second position and the deactivation of said brake in response to said braking command.

20. A combination as defined in claim 1, wherein said input clutch is a fluid-operated clutch and said control system further comprises a source of pressurized fluid and conduit means connecting said source with said input clutch, said means for increasing the degree of slip comprising a pressure relief valve installed in said conduit means and having valving means movable between first and second positions to thereby respectively permit the flow of fluid to said input clutch within a traction pressure range which is high enough to effect operation of said input clutch at least substantially without slip and a braking pressure range at which said input clutch operates with varying degrees of slip, said control system further comprising means for effecting movement of said valving means to said second position in response to transmission of a braking command to said component, and means including a mobile braking element for effecting movement of said valving means simultaneously with change-over of said reversing gearing.

21. A combination as defined in claim 20, wherein said braking element is a pivotable pedal and said control system further comprises means for moving said valving means in response to pivoting of said pedal.

* * * * *